(No Model.)
J. H. ADAMSON.
HARVESTING MACHINE.
No. 408,398. Patented Aug. 6, 1889.
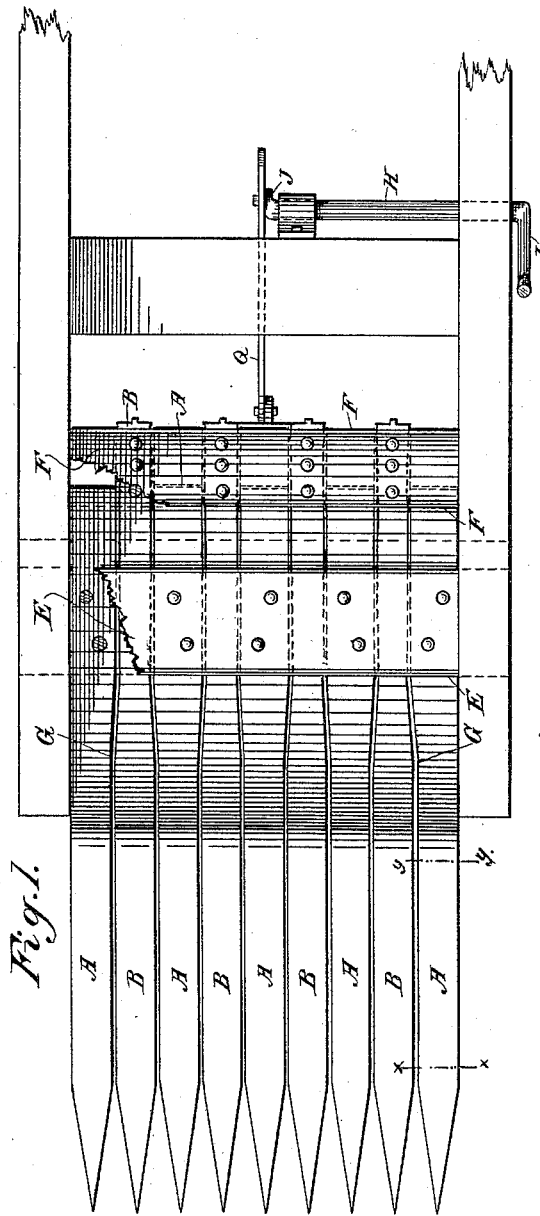
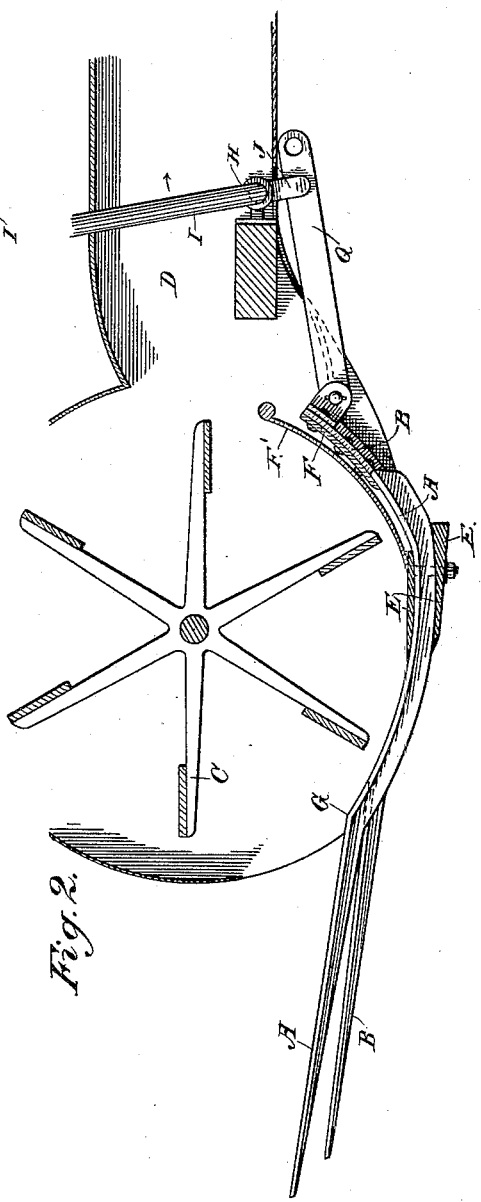
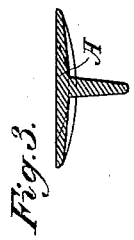
Witnesses,
Geo. H. Strong
J. H. Nourse
Inventor,
J. H. Adamson
By Dewey & Co.
Atty

UNITED STATES PATENT OFFICE.

JAMES HAZEL ADAMSON, OF NORTH MELBOURNE, VICTORIA.

HARVESTING-MACHINE.

SPECIFICATION forming part of Letters Patent No. 408,398, dated August 6, 1889.

Application filed September 21, 1888. Serial No. 286,040. (No model.) Patented in Victoria August 9, 1882, No. 3,280, and in South Australia December 10, 1883, No. 409.

*To all whom it may concern:*

Be it known that I, JAMES HAZEL ADAMSON, of North Melbourne, Colony of Victoria, Australia, have invented an Improvement in Harvesting-Machines, (for which I have obtained foreign patents as follows: Victoria, August 9, 1882, No. 3,280, and South Australia, December 10, 1883, No. 409;) and I hereby declare the following to be a full, clear, and exact description of the same.

My invention relates to certain improvements in harvesting-machines of that class in which a comb having long pointed teeth is employed to strip the heads from the standing grain without the use of a reciprocating sickle; and it consists in making the combs adjustable, so that the teeth may be opened or closed to suit heavy or light crops.

Referring to the accompanying drawings for a more complete explanation of my invention, Figure 1 is a plan view of the comb and adjacent parts. Fig. 2 is a vertical section taken across the bars to which the comb-teeth are secured, showing the relative position of the parts and the operating-lever. Figs. 3 and 4 are transverse sectional views of the teeth of the comb, taken on the line $x\,x$ and $y\,y$, respectively, of Fig. 1.

A and B are the teeth of the comb, extending to the front of the machine.

C is a revolving drum or beater, which is set in motion as the machine travels over the field, and throws the grain, chaff, and refuse into a box D in rear of the machine, it being guided into said box by means of a curved plate F', which serves as a bottom, over which the grain and heads pass into the box.

The comb-teeth A and B stand side by side and are riveted to separate bars, instead of being attached to one bar only. Every alternate tooth is riveted to a bar E, formed of two parts, one being above and the other below the teeth, and said bar is fastened firmly to the machine in the usual manner, and the other teeth B are fixed to a separate bar F. The bar F is made to move backward and forward, so that the teeth B will be advanced or retracted between the teeth A of the comb. These teeth are constructed as follows:

The rear concave portions of the teeth A are made broader at the rear end than the body of the teeth, being broadened from the point G, so as to be about one-fourth of an inch broader from side to side at the root or rear end than they are at this point. The teeth B are tapered and made correspondingly about one-fourth of an inch narrower at the root or rear end than they are at the point G, so that when the teeth B are retracted or drawn back the space between the rear portions of the teeth A and B will be made narrower and when they are advanced or pushed forward the space will be broadened. This is effected by the movement of the bar F, to which the teeth B are attached.

H is a shaft, which extends across the machine at the rear behind that portion in which the beater revolves, and I is a lever secured to this shaft. Upon the shaft is a short crank-arm J, to which the connecting link or rod Q is attached, and this connecting link or rod has its opposite end attached to the bar F, so that by the movement of the lever I this bar F may be retracted or pushed forward, carrying with it the teeth B. The movement of this bar beneath the curved portion of the bottom, owing to the curvature of the teeth, is such that when the teeth B are forced forward through the bar E, which serves as a guide for them, they will extend nearly or quite in a plane with the teeth A, but when retracted or drawn back they will also be slightly depressed, so that the spaces between the forward portion of the teeth A and B will be made wider, and the apparatus can be employed to gather a tangled crop, which an ordinarily-constructed comb would not take in.

In order to make the teeth of the comb light, and at the same time more rigid, they are made in the form of a T, as shown in the sections, Figs. 3 and 4. The horizontal portions of the teeth present thin edges, which allow the straw to pass readily between the adjacent teeth of the comb, and the central fin or rib, which extends downward from the horizontal portion, gives strength and rigidity or stiffness to the teeth, which is very important. The upper portion of the bar E is made with a thin cutting-edge at the front toward the straw, which insures the heads being cut off with greater ease and certainty.

Having thus described my invention, what I claim as new, and desire to secure by Letters Patent, is—

1. The harvester-comb composed of alternate fixed and movable teeth, one set diminishing in width toward the rear end and the other set placed alternately with the first and increasing in width toward the rear end, in combination with a mechanism whereby the second set may be drawn backward or moved forward with relation to the first set, substantially as herein described.

2. The alternate teeth A A of the harvester-comb, having their rear ends made broader and fixed to a stationary bar, in combination with the teeth B B, placed alternately between the teeth A, having their rear ends tapering or made narrower than the forward ends and fixed to a movable bar, a lever, and connecting-link by which this bar may be moved forward or backward to close or open the spaces between the teeth A and B, substantially as described.

3. The teeth A, made broader toward their rear end than at the knee or central portion, in combination with the alternate teeth B, narrowing from the center toward the rear, the two-part fixed transverse bar E, the movable bar to which the teeth B are secured, and means for operating said bar, substantially as described.

4. The horizontal two-part fixed guide-bar E, having the upper part made with a cutting forward edge and the teeth A fixed between the upper and lower portions of said bar, in combination with the intermediate teeth B, sliding through said guide-bar, and a mechanism whereby they are reciprocated, substantially as herein described.

It witness whereof I have hereunto set my hand.

JAMES HAZEL ADAMSON.

Witnesses:
JAMES FLATLEY,
JOSEPH H. BUSH.